United States Patent
Holmes et al.

(10) Patent No.: US 8,402,921 B2
(45) Date of Patent: *Mar. 26, 2013

(54) DAIRY INFLATION

(75) Inventors: Jeannie Holmes, Weatherford, TX (US); Steve Meeks, Mineral Wells, TX (US)

(73) Assignee: M Management-Tex, LLC, Weatherford, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/158,271

(22) Filed: Jun. 10, 2011

(65) Prior Publication Data

US 2012/0060760 A1     Mar. 15, 2012

Related U.S. Application Data

(63) Continuation of application No. 11/260,344, filed on Oct. 27, 2005, now Pat. No. 7,966,970.

(60) Provisional application No. 60/700,594, filed on Jul. 19, 2005.

(51) Int. Cl.
*A01J 5/06* (2006.01)

(52) U.S. Cl. ............... 119/14.52; 119/14.47; 119/14.49

(58) Field of Classification Search ............... 119/14.47, 119/14.48, 14.49, 14.5, 14.51, 14.52, 14.53
See application file for complete search history.

(56) References Cited

U.S. PATENT DOCUMENTS

| | | | |
|---|---|---|---|
| 776,777 A | 12/1904 | Dietz | |
| 1,965,647 A | 7/1934 | Jackson | |
| 2,182,454 A | 12/1939 | Sherman | |
| 2,506,928 A | 5/1950 | Augusta | |
| 2,774,509 A | 12/1956 | Knobloch | |
| 3,296,153 A | 1/1967 | Snogren | |
| 3,419,593 A | 12/1968 | Willing | |
| 3,475,332 A | 10/1969 | Leeper et al. | |
| 3,638,583 A | 2/1972 | Goodier et al. | |
| 3,659,557 A | 5/1972 | Noorlander | |
| 3,669,606 A | 6/1972 | Brown | |
| 3,715,047 A | 2/1973 | Sado | |
| 3,715,329 A | 2/1973 | Glaister | |
| 3,771,494 A | 11/1973 | Mills | |
| 3,814,731 A | 6/1974 | Nitzche et al. | |
| 3,900,617 A | 8/1975 | Grenoble | |

(Continued)

FOREIGN PATENT DOCUMENTS

AU     659437     8/1992
AU     691497     11/1994

(Continued)

OTHER PUBLICATIONS

Restriction requirement mailed Mar. 27, 2008 for U.S. Appl. No. 11/260,344.

(Continued)

*Primary Examiner* — David Parsley
(74) *Attorney, Agent, or Firm* — Patton Boggs LLP (57) ABSTRACT

A dairy inflation includes a barrel portion connected to a milk tube portion for extracting milk from a teat of an animal. The barrel portion includes an axial passage defined by a wall, the wall having an exterior surface defining an outer periphery having a substantially circular shape. The wall further includes an interior surface defining an inner periphery having a substantially elliptical shape. The elliptical inner periphery includes a major axis and a minor axis, and the disposition of the elliptical inner periphery within the circular outer periphery creates reduced-thickness regions on opposing sides of the wall along the major axis. The reduced-thickness regions allow a controlled collapse of the barrel portion during milking operations.

18 Claims, 4 Drawing Sheets

U.S. PATENT DOCUMENTS

| | | | |
|---|---|---|---|
| 3,919,161 A | 11/1975 | Glaister | |
| 3,972,850 A | 8/1976 | Hamilton et al. | |
| 3,981,656 A | 9/1976 | Steels et al. | |
| 3,984,022 A | 10/1976 | Babiol | |
| 4,002,773 A | 1/1977 | Entenmann | |
| 4,028,339 A | 6/1977 | Merrill | |
| 4,031,059 A | 6/1977 | Strauss | |
| 4,042,543 A | 8/1977 | Strickman et al. | |
| 4,076,207 A | 2/1978 | Austin | |
| 4,141,319 A | 2/1979 | Maier et al. | |
| 4,165,061 A | 8/1979 | Kupperman et al. | |
| 4,183,998 A | 1/1980 | Vassiliou | |
| 4,200,658 A | 4/1980 | Katzman et al. | |
| 4,216,241 A | 8/1980 | Thompson | |
| 4,223,069 A | 9/1980 | Berghmans | |
| 4,280,446 A | 7/1981 | Noorlander et al. | |
| 4,363,849 A | 12/1982 | Paisley et al. | |
| 4,425,872 A | 1/1984 | Mills | |
| 4,452,859 A | 6/1984 | Nishijima et al. | |
| 4,459,247 A | 7/1984 | Rothemund | |
| 4,459,939 A | 7/1984 | Noorlander | |
| 4,463,029 A | 7/1984 | Nishijima et al. | |
| 4,473,919 A | 10/1984 | Fritz, Jr. | |
| 4,477,517 A | 10/1984 | Rummel | |
| 4,529,741 A | 7/1985 | Bauman et al. | |
| 4,530,307 A | 7/1985 | Thompson | |
| 4,585,705 A | 4/1986 | Broderick et al. | |
| 4,585,848 A | 4/1986 | Evans et al. | |
| 4,610,220 A | 9/1986 | Goldberg et al. | |
| 4,623,565 A | 11/1986 | Huybrechts et al. | |
| 4,640,671 A | 2/1987 | Skostins | |
| 4,647,641 A | 3/1987 | Westbrook | |
| 4,651,676 A | 3/1987 | Kupres | |
| 4,731,517 A | 3/1988 | Cheney | |
| 4,812,115 A | 3/1989 | Kemp | |
| 4,826,029 A | 5/1989 | Skoglie | |
| 4,852,204 A | 8/1989 | Wilson | |
| 4,869,205 A | 9/1989 | Larson | |
| 4,895,766 A | 1/1990 | Saad | |
| 4,923,755 A | 5/1990 | Witucki | |
| 4,929,460 A | 5/1990 | Lagarde et al. | |
| 4,964,368 A | 10/1990 | Ball et al. | |
| 4,981,637 A | 1/1991 | Hyer | |
| 4,986,432 A | 1/1991 | Anghileri | |
| 5,007,378 A | 4/1991 | Larson | |
| 5,069,162 A | 12/1991 | Thompson et al. | |
| 5,071,695 A | 12/1991 | Tannenbaum | |
| 5,107,563 A | 4/1992 | Zimmerman et al. | |
| 5,162,397 A | 11/1992 | Descamps et al. | |
| 5,206,329 A | 4/1993 | Sumpter et al. | |
| 5,217,631 A | 6/1993 | Anghileri | |
| 5,232,959 A | 8/1993 | Togashi et al. | |
| 5,246,982 A | 9/1993 | Inoue et al. | |
| 5,252,685 A | 10/1993 | Arai et al. | |
| 5,283,927 A | 2/1994 | Gibbon et al. | |
| 5,317,047 A | 5/1994 | Sabate et al. | |
| 5,317,988 A | 6/1994 | Hoefelmayr et al. | |
| 5,349,718 A | 9/1994 | Gibbon | |
| D356,716 S | 3/1995 | Dornbush et al. | |
| 5,400,128 A | 3/1995 | Michlin | |
| 5,400,698 A | 3/1995 | Savage | |
| 5,428,097 A | 6/1995 | Kobayashi | |
| 5,478,605 A | 12/1995 | Ichise | |
| 5,480,915 A | 1/1996 | Burns | |
| 5,491,869 A | 2/1996 | Sullivan et al. | |
| 5,496,862 A | 3/1996 | Burns | |
| 5,521,245 A | 5/1996 | Hirabayashi et al. | |
| 5,623,028 A | 4/1997 | Fitzgerald et al. | |
| 5,641,831 A | 6/1997 | Hamilton | |
| 5,652,287 A | 7/1997 | Sullivan et al. | |
| 5,666,904 A | 9/1997 | Grindal | |
| 5,691,067 A | 11/1997 | Patel | |
| 5,692,629 A | 12/1997 | Burns | |
| 5,716,699 A | 2/1998 | Reo | |
| 5,767,185 A | 6/1998 | Reo | |
| D400,402 S | 11/1998 | Petkovich, Jr. | |
| 5,867,867 A | 2/1999 | Kessler | |
| 5,929,143 A | 7/1999 | Ward et al. | |
| 5,932,649 A | 8/1999 | Hergenrother et al. | |
| 5,955,149 A | 9/1999 | Kuziemka | |
| 5,981,610 A | 11/1999 | Meguriya et al. | |
| 5,997,627 A | 12/1999 | Babler | |
| 6,004,496 A | 12/1999 | Reo | |
| 6,022,816 A | 2/2000 | Dewar | |
| 6,077,592 A | 6/2000 | Azuma et al. | |
| 6,085,923 A | 7/2000 | Yaniger | |
| 6,146,673 A | 11/2000 | Ferguson | |
| 6,153,275 A | 11/2000 | Yaniger | |
| 6,197,359 B1 | 3/2001 | Hompanera | |
| 6,221,451 B1 | 4/2001 | Lauer et al. | |
| 6,245,431 B1 | 6/2001 | Gridwold | |
| 6,339,124 B1 | 1/2002 | Igarashi et al. | |
| 6,348,243 B1 | 2/2002 | Fuller et al. | |
| 6,427,624 B1 | 8/2002 | Briggs et al. | |
| 6,435,132 B1 | 8/2002 | Milbrath et al. | |
| 6,506,331 B2 | 1/2003 | Meguriya | |
| 6,528,152 B1 | 3/2003 | Piriwe | |
| 6,546,893 B1 * | 4/2003 | Happel et al. | 119/14.47 |
| 6,552,096 B2 | 4/2003 | Meguriya | |
| 6,613,406 B1 | 9/2003 | Yaniger | |
| 6,616,997 B1 | 9/2003 | Lauer et al. | |
| 6,750,279 B1 | 6/2004 | Wang | |
| 6,797,223 B2 | 9/2004 | Beale et al. | |
| 6,857,389 B2 | 2/2005 | Miller | |
| 6,976,597 B2 | 12/2005 | Jahrling et al. | |
| 7,028,367 B2 | 4/2006 | Sharabura et al. | |
| 7,150,221 B2 | 12/2006 | Morgan | |
| 7,282,532 B2 | 10/2007 | Holmes et al. | |
| 7,373,687 B2 | 5/2008 | Sharabura et al. | |
| 7,517,933 B2 | 4/2009 | Holmes et al. | |
| 7,703,167 B2 | 4/2010 | Sharabura et al. | |
| 7,966,970 B2 * | 6/2011 | Holmes et al. | 119/14.52 |
| 2001/0043977 A1 | 11/2001 | Hompanera | |
| 2002/0103275 A1 | 8/2002 | Nogueria de Sousa | |
| 2002/0110627 A1 | 8/2002 | Hirano | |
| 2002/0171027 A1 | 11/2002 | Martellato et al. | |
| 2003/0047838 A1 | 3/2003 | Hartwell et al. | |
| 2003/0071188 A1 | 4/2003 | Bruno | |
| 2003/0161985 A1 | 8/2003 | Lauer | |
| 2003/0165683 A1 | 9/2003 | Sharabura et al. | |
| 2003/0192847 A1 | 10/2003 | Jahrling et al. | |
| 2003/0229961 A1 | 12/2003 | Barnett | |
| 2004/0096558 A1 | 5/2004 | Meroni | |
| 2004/0249059 A1 | 12/2004 | Akbar et al. | |
| 2005/0165138 A1 | 7/2005 | Holmes et al. | |
| 2005/0193899 A1 | 9/2005 | DeBlassie et al. | |
| 2005/0199131 A1 | 9/2005 | Meeks et al. | |
| 2005/0199132 A1 | 9/2005 | Meeks et al. | |
| 2005/0247212 A1 | 11/2005 | Meeks et al. | |
| 2007/0017449 A1 | 1/2007 | Holmes et al. | |
| 2007/0203266 A1 | 8/2007 | Holmes et al. | |
| 2008/0263811 A1 | 10/2008 | Sharabura et al. | |

FOREIGN PATENT DOCUMENTS

| | | |
|---|---|---|
| AU | 734250 | 2/1999 |
| AU | 721157 | 12/1999 |
| AU | 730928 | 4/2000 |
| AU | 783552 | 6/2001 |
| AU | 2001/290763 B2 | 3/2002 |
| AU | 749676 | 5/2002 |
| CA | 1 177 600 | 10/1981 |
| DE | 102 58 345 A1 | 6/2004 |
| EP | 0 043 264 | 4/1985 |
| EP | 0 282 661 | 9/1988 |
| EP | 0 346 887 | 12/1989 |
| EP | 0 457 993 | 11/1991 |
| EP | 0 259 459 | 12/1991 |
| EP | 0 496 194 | 7/1992 |
| EP | 0 507 481 | 10/1992 |
| EP | 0 220 898 | 10/1993 |
| EP | 0 577 357 | 1/1994 |
| EP | 0 105 206 | 4/1994 |
| EP | 0 657 331 | 6/1995 |
| EP | 0 773 090 | 5/1997 |
| EP | 0 935 916 | 8/1999 |
| EP | 0 992 195 | 4/2000 |
| EP | 1 034 907 | 9/2000 |

| | | |
|---|---|---|
| EP | 1 088 855 | 4/2001 |
| EP | 1 197 149 | 4/2002 |
| EP | 1 233 014 | 8/2002 |
| FR | 1 518 450 | 4/1967 |
| FR | 2 658 034 | 8/1991 |
| FR | 2 710 001 | 3/1995 |
| FR | 2 715 407 | 7/1995 |
| FR | 2 747 885 | 10/1997 |
| FR | 2 747 886 | 10/1997 |
| GB | 1 207 674 | 10/1970 |
| GB | 1 563 051 | 12/1978 |
| GB | 2 119 620 A | 11/1983 |
| JP | 60025831 | 8/1985 |
| JP | 64-57710 | 3/1989 |
| JP | 2-077346 | 3/1990 |
| JP | 05-117530 | 5/1993 |
| JP | 06-262943 | 9/1994 |
| JP | 09-109365 | 4/1997 |
| JP | 09-136959 | 5/1997 |
| JP | 09-296136 | 11/1997 |
| JP | 10-7903 | 1/1998 |
| JP | 10001640 | 1/1998 |
| JP | 2000-160019 | 6/2000 |
| SI | 20738 | 6/2002 |
| WO | WO 80-01559 | 8/1980 |
| WO | WO 99/34685 | 7/1999 |
| WO | WO99/40794 | 8/1999 |
| WO | WO 03/004367 | 1/2003 |
| WO | WO 03/020817 | 3/2003 |
| WO | WO 03/029130 | 4/2003 |
| WO | WO 2005/073298 | 11/2005 |

OTHER PUBLICATIONS

Response to Restriction Requirement filed Jun. 26, 2008 for U.S. Appl. No. 11/260,344.
Restriction requirement mailed Aug. 8, 2008 for U.S. Appl. No. 11/260,344.
Response filed Sep. 8, 2008 for U.S. Appl. No. 11/260,344.
Non-Final Office Action mailed Nov. 10, 2008 for U.S. Appl. No. 11/260,344.
Response filed May 11, 2009 to Non-Final Office Action for U.S. Appl. No. 11/260,344.
Final Office Action mailed Jun. 29, 2009 for U.S. Appl. No. 11/260,344.
Examiner Interview Summary mailed Oct. 1, 2009 for U.S. Appl. No. 11/260,344.
RCE/Response filed Dec. 29, 2009 for U.S. Appl. No. 11/260,344.
Non-Final Action mailed Jan. 28, 2010 for U.S. Appl. No. 11/260,344.
Response filed Jul. 28, 2010 for U.S. Appl. No. 11/260,344.
Final Office Action mailed Sep. 14, 2010 for U.S. Appl. No. 11/260,344.
Notice of Allowance mailed Mar. 3, 2011 for U.S. Appl. No. 11/260,344.
Final Rejection mailed Sep. 30, 2011 for U.S. Appl. No. 11/025,038.
Non-Final Rejection mailed Sep. 21, 2011 for U.S. Appl. No. 12/711,174.
PCT International Search Report for International Application No. PCT/US2004/017697 dated Dec. 8, 2004.
Partial International Search Report dated May 26, 2006 for International Application No. PCT/US2005/047455 filed Dec. 28, 2005.
PCT International Search Report and Written Opinion for International Application No. PCT/US2005/047455 dated Aug. 18, 2006.
PCT International Search Report and Written Opinion date mailed Oct. 2, 2007 for PCT application No. PCT/US2006/027582.
PCT International Search Report for International Application No. PCT/US02/39430 dated Mar. 27, 2003.
PCT International Search Report and the Written Opinion of the International Searching Authority, or the Declaration mailed May 23, 2005 in PCT/US2005/002028.
PCT International Search Report and Written Opinion of the International Searching Authority or the Declaration mailed on Mar. 17, 2008 in PCT International Application No. PCT/US07/23734.
"Sasa Demarle" Product Information for Flexipan® and Silpat®; Demarle, Inc. USA [available online at www.demarleusa.com]; retrieved from the Internet on Apr. 16, 2003 from URL:<http://www.demarleusa.com>. (original Internet Publicaiton Date Unknown). (3 pages).
"Proflex. Unique gourmet bakeware guaranteeing the easy release of any cake"; Tefal; retrieved from the internet on Nov. 11, 2004 at URL:<http://www.tefal.co.uk/tefal/products/index.asp?category%5Fid=100&dept%5fid . . . >. (original Internet Publicaiton Date Unknown) (2 pages).
Affidavit of Jeannie Holmes; executed Nov. 2, 2004; 1 page.
"Harvesting Natural Cork;" Cork Quality Council; (available online at ww.corkqc.com); retrieved from the Internet on Nov. 3, 2003 at URL: <http://www.corkqc.com/cqcharve.htm> (original Internet publication date unknown); (4 pages).
History of Cork; About Wine (available online at http://wine.about.com); retrieved from the Internet on Nov. 6, 2003 at URL: <http://wine.about.com/library/weekly/aa081098.htm>. (original Internet publication date unknown; (4 pages).
"Support for Cork Plummets according to Cork Industry Surveys;" Wine of the Week (available online at www.wineoftheweek.com); retrieved from the Internet on Nov. 6, 2003 at URL:<http://www.wineoftheweek.com/murray/0209apcor.html> (original Internet publication date unknown); (3 pages).
"Rubber Cork Stopper"; Advance Cork International [available online at www.advancecork.com]; retrieved from the Internet on Nov. 22, 2006 at URL: <http://www.advancecork.com/rubber-cork-stopper.html>. (Original Internet publication date unknown).
AUSIMONT; Algoflon Properties and Applications Selection Guide, Jul. 1999, 8 pages.
Abstract of Patent App. No. 93119903, entitled Method of Producing Wiper Blade Rubber and Wiper Blade Rubber Produced Therby, published Apr. 7, 1999, see pp. 3-4 of nerac.com Retro Search.
Abstract of Patent App. No. 87901997, entitled Powder Atomizing Methods and Apparatus, published Dec. 27, 1991, see pp. 4-6 of nerac.com Retro Search.
Abstract of Patent App. No. 08169727, entitled Aliphatic Nylon Solution and Wiper Blade Coated Therewith, published Jan. 13, 1998, see pp. 6-7 of nerac.com Retro Search.
Abstract of Patent App. No. 08172837, entitled Coating Composition for Wiper Blade Rubber, published Jan. 6, 1998, see p. 7 of nerac.com Retro Search.
Abstract of Patent App. No. 08146423, entitled Coating Composition for Repairing Wiper Blade Rubber, published Nov. 18, 1997, see pp. 7-8 of nerac.com Retro Search.
Abstract of Patent App. No. 07298266, entitled Wiper Blade, published May 27, 1997, see p. 8 of nerac.com Retro Search.
Abstract of patent App. No. 07267191, entitled Solder Paste Pringing Squeegee, published Apr. 28, 1997, see pp. 8-9 of nerac.com Retro Search.
Abstract of patent App. No. 837891, entitled Method of Making a Silicone rubber Windshield Wiper, Dec. 21, 1999, see pp. 9-10 of nerac.com Retro Search.
Abstract of patent App. No. 837754, entitled Moldable and Tintable Silicone Rubber Composition for Windshield Wiper Blade, Jun. 16, 1998, see p. 10 of nerac.com Retro Search.
Abstract of Patent App. No. 603920, entitled Silicone Rubber Windshield Wiper Blade, Feb. 10, 1998, see pp. 10-11 of nerac.com Retro Search.
Abstract of Patent App. No. 358567, entitled Method of Producing Rubber Wiper Blades, Dec. 26, 1995, see pp. 11-12 of nerac.com Retro Search.
Abstract of Patent App. No. 101016, entitled Wiper and Spreader Blades with Conductive Coating, Mar. 21, 1995, see p. 12 of nerac.com Retro Search.
Abstract of Patent App. No. 584539, entitled Non Stick Windshield Wipers, Apr. 28, 1992, see p. 13 of nerac.com Retro Search.
Abstract of Patent App. No. 112531, entitled Windshield Wiper Structure, Aug. 1, 1989, see pp. 13-14 of nerac.com Retro Search.
Abstract of Patent App. No. 839284, entitled Powder Atomizing Methods and Apparatus, Mar. 15, 1988, see pp. 14-15 of nerac.com Retro Search.
Abstract of Patent App. No. 05050875, entitled Window Shiled System for Automobile, published Sep. 20, 1994, see pp. 15-16 of nerac.com Retro Search.

Abstract of Patent App. No. 03311899, entitled Silicon Rubber Composition for Wiper Blade, published May 14, 1993, see p. 16 of nerac.com Retro Search.
Abstract of Patent App. No. 63229588, entitled Wiper Blade, published Mar. 16, 1990, see pp. 16-17 of nerac.com Retro Search.
Abstract of Patent App. No. 62215594, entitled Manufacture of Chip Type Solid Electrolytic Capcitor, published Mar. 6, 1989, see p. 17 of nerac.com Retro Search.
Abstract of Patent App. No. 58134257, entitled Windshield Wiper for Automobile, published Feb. 8, 1985, see pp. 17-18 of nerac.com Retro Search.
Abstract of Japanese Patent App. No. 10-3380003, Publication No. 2000-160019, entitled Silicone Rubber Composition for Wiper Blade, published Jun. 13, 2000.
Abstract of Japanese Patent App. No. 03-311899, Publication No. 05-117530, entitled Silicone Rubber Composition for Wiper Blade, published May 14, 1993.
New Zealand Intellectual Property Office Examination Report dated Jul. 27, 2007 in New Zealand Patent Application No. 543958.
Response to Restriction Requirement filed Oct. 27, 2004 for U.S. Appl. No. 10/685,052.
Response to Restriction Requirement filed Mar. 2, 2005 for U.S. Appl. No. 10/685,052.
Non-Final Office Action dated Jun. 17, 2005 for U.S. Appl. No. 10/685,052.
Response filed Nov. 17, 2005 to Non-Final Office Action for U.S. Appl. No. 10/685,052.
Final Office Action dated Jan. 25, 2006 for U.S. Appl. No. 10/685,052.
Response filed Apr. 25, 2006 for U.S. Appl. No. 10/685,052.
Notice of Non-compliant Amendment dated May 9, 2006 for U.S. Appl. No. 10/685,052.
Response filed May 15, 2006 to Notice of Non-compliant Amendment for U.S. Appl. No. 10/685,052.
Non-Final Office Action dated Jun. 30, 2006 for U.S. Appl. No. 10/685,052.
Response filed Oct. 2, 2006 to Non-Final Office Action for U.S. Appl. No. 10/685,052.
Notice of Allowability dated Feb. 2, 2007 for U.S. Appl. No. 10/685,052.
Amendment to Notice of Allowability May 2, 2007 for U.S. Appl. No. 10/685,052.
Rule 312 Communication dated Jun. 18, 2007 for U.S. Appl. No. 10/685,052.
Non-Final Office Action dated Oct. 10, 2007 for U.S. Appl. No. 11/025,125.
Response filed Apr. 10, 2008 to Non-Final Office Action for U.S. Appl. No. 11/025,125.
Final Office Action dated Jun. 30, 2008 for U.S. Appl. No. 11/025,125.
RCE/Response filed Dec. 1, 2008 to Final Office Action for U.S. Appl. No. 11/025,125.
Non-Final Office Action dated Feb. 11, 2009 for U.S. Appl. No. 11/025,125.
Response filed Jul. 13, 2009 to Non-Final Action for U.S. Appl. No. 11/025,125.
Final Office Action dated Nov. 18, 2009 issued in U.S. Appl. No. 11/025,125.
Non-Final Office Action dated Oct. 11, 2007 for U.S. Appl. No. 11/025,175.
Notice of Abandonment dated May 13, 2008 for U.S. Appl. No. 11/025,175.
Non-Final Office Action dated Oct. 11, 2007 for U.S. Appl. No. 11/025,108.
Response filed Apr. 11, 2008 to Non-Final Office Action for U.S. Appl. No. 11/025,108.
Final Office Action dated Jul. 3, 2008 for U.S. Appl. No. 11/025,108.
Notice of Abandonment dated Mar. 4, 2009 for U.S. Appl. No. 11/025,108.
Non-Final Office Action dated Oct. 3, 2007 for U.S. Appl. No. 11/025,038.
Response filed Apr. 7, 2008 to Non-Final Office Action for U.S. Appl. No. 11/025,038.
Final Office Action dated Jul. 1, 2008 for U.S. Appl. No. 11/025,038.
RCE/Response filed Dec. 1, 2008 to Final Office Action for U.S. Appl. No. 11/025,038.
Final Office Action dated Feb. 11, 2009 for U.S. Appl. No. 11/025,038.
RCE/Response filed Jul. 13, 2009 to Final Office Action for U.S. Appl. No. 11/025,038.
Non-Final Action dated Sep. 3, 2009 for U.S. Appl. No. 11/025,038.
Non-Final Office Action dated May 28, 2008 for U.S. Appl. No. 11/810,369.
Examiner Interview Summary issued on Sep. 9, 2008 in U.S. Appl. No. 11/810,369.
Response and Terminal Disclaimers filed Sep. 26, 2008 for U.S. Appl. No. 11/810,369.
Notice of Allowance dated Dec. 3, 2008 for U.S. Appl. No. 11/810,369.
Non-Final Office Action dated Nov. 12, 2004 for U.S. Appl. No. 10/764,094.
Response filed Feb. 14, 2005 to Non-Final Action for U.S. Appl. No. 10/764,094.
Non-Final Office Action dated Jun. 21, 2005 for U.S. Appl. No. 10/764,094.
Response filed Sep. 21, 2005 to Non-Final Action for U.S. Appl. No. 11/764,094.
Non-Final Office Action dated Dec. 6, 2005 for U.S. Appl. No. 10/764,094.
Response filed Apr. 3, 2006 to Non-Final Action for U.S. Appl. No. 10/764,094.
Final Office and Examiner Interview Summary Action for U.S. Appl. No. 10/764,094.
Response filed Oct. 2, 2006 to Final Office Action for U.S. Appl. No. 10/764,094.
Advisory Action dated Oct. 23, 2006 for U.S. Appl. No. 10/764,094.
RCE/Amendment filed Nov. 22, 2006 in Response to Final Action dated May 24, 2006 and Advisory Action dated Oct. 23, 2006 for U.S. Appl. No. 10/764,094.
Non-Final Office Action dated Feb. 27, 2007 for U.S. Appl. No. 10/764,094.
Response filed Aug. 2, 2007 to Non-Final Action for U.S. Appl. No. 10/764,094.
Final Office Action dated Sep. 18, 2007 for U.S. Appl. No. 10/764,094.
RCE/Amendment filed Mar. 18, 2008 to Final Action for U.S. Appl. No. 10/764,094.
Non-Final Office Action dated Apr. 7, 2008 for U.S. Appl. No. 10/764,094.
Response filed Oct. 7, 2008 to Non-Final Office Action for U.S. Appl. No. 10/764,094.
Final Office Action Dec. 17, 2008 for U.S. Appl. No. 10/764,094.
RCE/Amendment filed Jun. 17, 2009 to Final Office Action for U.S. Appl. No. 10/764,094.
Non-Final Office Action dated Aug. 3, 2009 for U.S. Appl. No. 10/764,094.
Non-Final Action dated Aug. 26, 2009 in U.S. Appl. No. 11/598,553.
Notice of Allowance and Examiner Interview Summary dated Oct. 21, 2005 for U.S. Appl. No. 10/313,346.
Amendment After Notice of Allowance filed Jan. 20, 2006 in U.S. Appl. No. 10/313,346.
Communication Re 312 Amendment issued on Mar. 2, 2006 in U.S. Appl. No. 10/313,346.
Non-Final Office Action dated Jul. 23, 2007 for U.S. Appl. No. 11/358,525.
Response and Terminal Disclaimer filed Oct. 29, 2007 to Non-Final Office Action for U.S. Appl. No. 11/358,525.
Terminal Disclaimer filed on Dec. 26, 2009 for U.S. Appl. No. 11/358,525.
Notice of Allowance dated Jan. 16, 2008 for U.S. Appl. No. 11/358,525.
Non-Final Office Action dated Apr. 13, 2009 for U.S. Appl. No. 12/123,306.
Response and Terminal Disclaimer filed Sep. 14, 2009 to Non-Final Office Action for U.S. Appl. No. 12/123,306.

Notice of Allowance, Examiner Interview Summary and Terminal Disclaimer Approval dated Oct. 15, 2009 for U.S. Appl. 12/123,306.
Notice of Abandonment date mailed Feb. 18, 2010 in U.S. Appl. No. 10/764,094.
Response filed Jan. 4, 2010 to Non-Final Action for U.S. Appl. No. 11/025,038.
Final Rejection mailed Apr. 14, 2010 for U.S. Appl. No. 11/025,038.
RCE/Response filed Oct. 14, 2010 for U.S. Appl. No. 11/025,038.
Non-Final Rejection dated Jan. 4, 2011 for U.S. Appl. No. 11/025,038.
Response to Non-Final Office Action filed Jul. 1, 2011 for U.S. Appl. No. 11/025,038.
Notice of Abandonment date mailed Mar. 14, 2010 for U.S. Appl. No. 11/598,553.
Final Rejection date mailed Apr. 14, 2010 for U.S. Appl. No. 11/025,038.
Examiner Interview Summary date mailed Apr. 23, 2010 for U.S. Appl. No. 11/025,125.
RCE/Response filed May 17, 2010 for U.S. Appl. No. 11/025,125.
Non-Final Office Action date mailed Jul. 22, 2010 for U.S. Appl. No. 11/025,125.
Notice of Allowance issued Apr. 14, 2011 for U.S. Appl. No. 11/025,125.
Restriction Requirement dated Sep. 27, 2004 for U.S. Appl. No. 10/685,052.
Notice of Abandonment date mailed Apr. 25, 2012 for U.S. Appl. No. 11/025,038.
Notice of Abandonment date mailed Apr. 4, 2012 for U.S. Appl. No. 12/711,174.

* cited by examiner

DAIRY INFLATION

CROSS-REFERENCE TO RELATED APPLICATIONS

This application is a continuation of U.S. application Ser. No. 11/260,344, filed Oct. 27, 2005, now U.S. Pat. No. 7,966,970, which claims the benefit of and priority to U.S. Provisional Application No. 60/700,594, filed Jul. 19, 2005, both of which are hereby incorporated by reference.

BACKGROUND OF THE INVENTION

1. Field of the Invention

The present invention relates generally to dairy inflations for extracting milk from an animal.

2. Description of Related Art

Milking equipment employing dairy inflations is used extensively in dairy operations in the United States. Many milking systems include a relatively hard or rigid outer shell within which is mounted a flexible, resilient dairy inflation. Such dairy inflations are also commonly referred to as liners or teat cups. Fluctuating, or cyclical, pressures are applied to an annulus between the shell and the outer surface of the dairy inflation to massage an animal's teat, which is held by the dairy inflation. The massaging of the teat causes the ejection of milk, which is then drawn through tubing to a centralized collecting vessel.

Dairy inflations made from silicone have typically had disadvantages compared to natural rubber inflations, one of which is due to the lower tear strength of silicone compounds. Low tear strength equates to a reduction in the number of milking cycles an inflation can perform during its useful life. Another disadvantage associated with some silicone compounds is the tendency of the compounds to absorb milk fat. High milk fat absorption can cause inflations to emit a bad odor with extended use. A third disadvantage is related to the relatively high drag coefficients associated with silicone compounds. Higher drag coefficients generally present a tackier surface, which can cause the inflation to climb the cow's udder during milking. This movement of the dairy inflation up the cow's udder usually causes the cow to kick the milking apparatus off, thereby interrupting the milking process. Another problem associated with silicone dairy inflations, which may also be prevalent in dairy inflations made from other materials, is premature rupture or tearing of the wall of the inflation in areas of reduced strength.

A need therefore exists for a dairy inflation compound that overcomes the disadvantages associated with synthetic, and more specifically silicone, dairy inflations. A need further exists for structural designs that will increase the effective life of the dairy inflation.

BRIEF SUMMARY OF THE INVENTION

The problems presented by existing dairy inflations are solved by the systems of the present invention. A dairy inflation is provided in accordance with the principles of the present invention and includes a mouth portion having an opening to receive the teat of an animal. A barrel portion includes an axial passage defined by a wall. The axial passage is fluidly connected to the opening of the mouth portion. The wall of the barrel portion includes at least one reduced thickness region to allow controlled collapse of the barrel portion during milking operations. A milk tube portion is connected to the barrel portion and includes an axial passage fluidly connected to the axial passage of the barrel portion.

Also in accordance with the principles of the present invention, a dairy inflation is provided that includes a barrel portion having an axial passage defined by a wall. The wall includes an exterior surface defining an outer periphery, the outer periphery having one of a substantially circular shape and a substantially elliptical shape. An interior surface of the wall defines an inner periphery that includes another of the substantially circular shape and the substantially elliptical shape. The elliptically shaped periphery has a major axis and a minor axis, and the wall includes a reduced thickness region on opposing sides of the wall along the major axis. A milk tube portion is connected to the barrel portion and includes an axial passage fluidly connected to the axial passage of the barrel portion.

Also in accordance with the principles of the present invention, a dairy inflation is provided that includes a substantially cylindrical wall having at least one region of reduced thickness to allow a controlled collapse of the wall to reduce stress in areas of the wall that are not reduced thickness.

Also in accordance with the principles of the present invention, a dairy inflation compound is provided that includes a first methyl vinyl silicone polymer from about 45 to 65 weight percent, a second methyl vinyl silicone polymer from about 1 to 10 weight percent, treated fumed silica from about 20 to 40 weight percent, dimethylsiloxane fluid OH end block from about 1 to 10 weight percent, silicone hydride from about 0.1 to 25 weight percent, a platinum catalyst from about 0.1 to 5 weight percent, and an inhibitor from about 0.05 to 5 weight percent. The first methyl vinyl silicone polymer has about 0.2 weight percent end-blocked vinyl, while the second methyl vinyl silicone polymer has about 13.0 weight percent pendant and end-blocked vinyl.

Also in accordance with the principles of the present invention, a dairy inflation compound is provided that includes a high tear silicone base from about 45 to 75 weight percent, a second silicone base from about 25 to 55 weight percent, high vinyl silicone gum from about 0.5 to 10 weight percent, silicone hydride from about 0.1 to 25 weight percent, a platinum catalyst from about 0.1 to 5 weight percent, and an inhibitor from about 0.05 to 5 weight percent. The high tear silicone base has a durometer range of about 45 to 55 Shore A pts, while the second silicone base has a durometer range of about 65 to 75 Shore A pts.

Also in accordance with the principles of the present invention, a dairy inflation is provided that includes a mouth having an opening configured to engage the teat of the animal. A barrel is connected to the mouth and includes an axial passage concentrically aligned with the opening of the mouth. A milk tube is connected to the barrel and includes an axial passage concentrically aligned with the axial passage of the barrel. At least one of the mouth, barrel, and milk tube are made from a compound having a first methyl vinyl silicone polymer from about 45 to 65 weight percent, a second methyl vinyl silicone polymer from about 1 to 10 weight percent, treated fumed silica from about 20 to 40 weight percent, dimethylsiloxane fluid OH end block from about 1 to 10 weight percent, silicone hydride from about 0.1 to 25 weight percent, a platinum catalyst from about 0.1 to 5 weight percent, and an inhibitor from about 0.05 to 5 weight percent. The first methyl vinyl silicone polymer includes about 0.2 weight percent end-blocked vinyl, while the second methyl vinyl silicone polymer includes about 13.0 weight percent pendant and end-blocked vinyl.

Also in accordance with the principles of the present invention, a dairy inflation system is provided having a dairy inflation including a mouth portion, a barrel portion, and a milk tube portion. The mouth portion includes an opening configured to engage the teat of an animal. The barrel portion is connected to the mouth portion and includes an axial passage concentrically aligned with the opening of the mouth portion. The barrel portion further includes a reinforcement ring defining a shoulder at an end of the barrel portion opposite the mouth portion. The milk tube portion is connected to the barrel portion and includes an axial passage concentrically aligned with the axial passage of the barrel portion. The dairy inflation system further includes a shell member having a substantially cylindrical wall defining an axial passage for receiving the barrel portion of the dairy inflation. The shell member has a proximal end, a distal end, and an inwardly tapered portion terminating at a distal opening of the shell member. A ring is provided and includes a substantially planar region and a hook region, the hook region extending radially outward to form a recess. The ring engages the distal end of the shell member such that the distal opening of the shell member is received by the recess. The mouth portion of the dairy inflation sealingly engages the proximal end of the shell member. The ring is positioned against the shoulder of the reinforcement ring to provide sealing engagement of the distal end of the shell member with the dairy inflation and to protect the dairy inflation from being damaged by the distal opening.

Other objects, features, and advantages of the present invention will become apparent with reference to the drawings and detailed description that follow.

DETAILED DESCRIPTION OF THE PREFERRED EMBODIMENT

In the following detailed description of the preferred embodiments, reference is made to the accompanying drawings, which form a part hereof and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
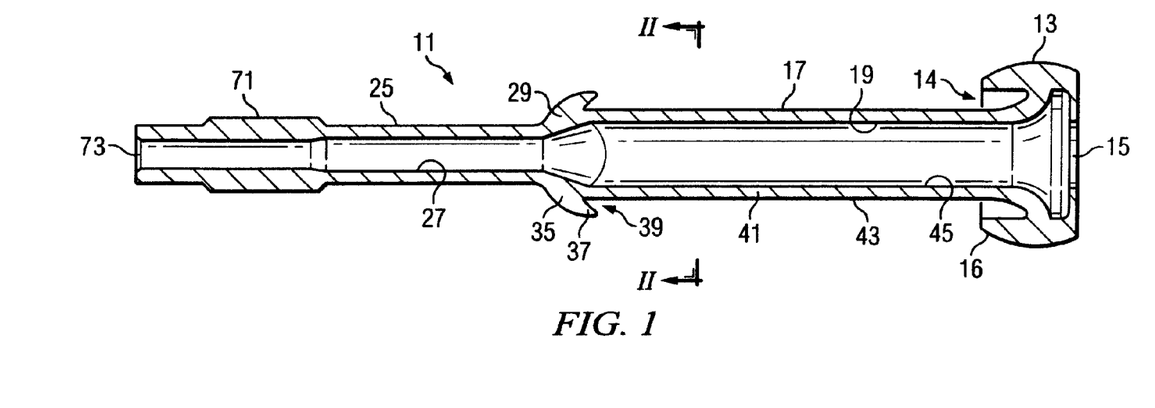
FIG. 1 illustrates a cross-sectional front view of a dairy inflation according to an embodiment of the present invention.

Referring to FIG. 1, a dairy inflation 11 according to an embodiment of the present invention is provided for extracting milk from a cow or other animal. The dairy inflation 11 includes a mouth portion 13 having an opening 15 configured to engage a teat of the animal. The mouth portion 13 includes a lip 16 extending away from the opening 15 to create a recess 14. A barrel portion 17 may be integrally connected to the mouth 13, the barrel portion 17 having an axial passage 19 fluidly connected to the opening 15 of the mouth portion 13. A milk tube portion 25 may be integrally connected to the barrel portion 17, the milk tube portion 25 having an axial passage 27 fluidly connected to the axial passage 19 of the barrel portion 17. Preferably, though not necessarily, the opening 15 of the mouth portion 13, the axial passage 19 of the barrel portion 17, and the axial passage 27 of the milk tube portion 25 are coaxial. In one embodiment, the diameter of the axial passage 27 may be less than the diameter of the axial passage 19. In this embodiment, the barrel portion 17 may include a transition region 29 at an end of the barrel portion 17 opposite the mouth portion 13. The axial passage 19 passing through the transition region 29 tapers down to a smaller diameter that preferably equals the diameter of the axial passage 27 of the milk tube portion 25.

A reinforcement ring 35 may be circumferentially positioned around an outer surface of the barrel portion 17 at the transition region. As will be discussed in more detail below, the reinforcement ring 35 provides additional material in the transition region 29 to minimize the risk of the dairy inflation 11 tearing in this particular region. In one embodiment, the reinforcement ring 35 may include an umbrella 37 that extends radially outward from the barrel portion 17 to form a recess 39 beneath the umbrella 37.

Figure 2:
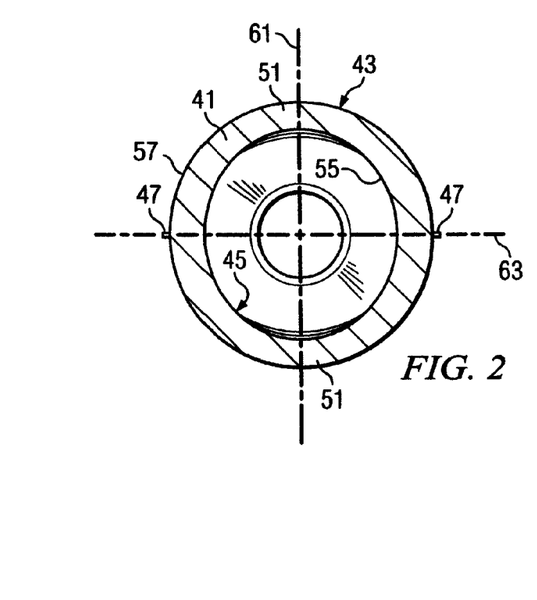
FIG. 2 depicts a cross-sectional side view of the dairy inflation of FIG. 1 taken at FIG. 3 illustrates a perspective view of the dairy inflation of FIG. 1 inserted within a shell member.

Referring still to FIG. 1, but also to FIG. 2, the axial passages 19, 27 are defined by a wall 41 having an exterior surface 43 and an interior surface 45. A parting line 47 runs the axial length of the dairy inflation 11 and is formed by the molding process used to create the dairy inflation 11. As described in more detail below, the dairy inflation 11 may be made from a silicone rubber composition. Since the coefficient of friction of most silicone rubbers is greater than that of natural rubbers, a molded dairy inflation may not be easily extracted from a single-piece mold. Consequently, it may be necessary to use a multi-piece mold such as a two-piece mold to form the dairy inflation of the present invention. When each piece of a two-piece mold is used to form a hemispherical portion of the dairy inflation extending along its axial length, the parting line 47 is created where the two halves of the mold mate. The region around the parting line 47 is typically weaker and more susceptible to tearing than other areas of the wall 41, especially when subjected to cyclical forces such as those encountered by the barrel portion 17 of the dairy inflation 11. In testing performed on one-piece silicone dairy inflations formed from two-part mold systems (i.e. silicone dairy inflations with parting lines), failure of the dairy inflation was more likely to occur along the parting lines. This was especially true when the dairy inflation was subjected to cyclical loading conditions such as those experienced by the barrel portion 17 of the dairy inflation 11.

The wall 41 of the barrel portion 17 is shaped such that it contains at least one, and preferably more than one, reduced-thickness region 51. The reduced-thickness region 51 is a portion of the wall 41 that is less thick than other portions of the wall 41 at a given cross-section of the wall 41 such as that illustrated in FIG. 2. Preferably, the reduced-thickness region 51 is formed by having an inner periphery 55 of the wall 41 (defined by the interior surface 45) shaped differently from an outer periphery 57 of the wall 41 (defined by the exterior surface 43). For example, the embodiment illustrated in FIG. 2 includes an outer periphery 57 having a round, or circular shape. The inner periphery 55 is elliptical or oval shaped. The elliptical inner periphery 55 includes a major axis 61 and a minor axis 63. The elliptical inner periphery is oriented such that the minor axis 61 passes through the parting lines 47 on each side of dairy inflation 11. In the embodiment illustrated in FIG. 2, the major axis 63 is radially offset about 90 degrees from the parting lines. Because the ellipse is longer along the major axis 63, the reduced-thickness region 51 of the wall 41 is formed along the major axis substantially midway between each of the parting lines 47. In one embodiment, the reduced thickness regions 51 run axially along the entire length of the barrel portion 17, except through the transition region 29. Within the transition region, the cross-section associated with the interior surface 45 is preferably substantially circular in shape. It should be noted, however, that the reduced thickness regions 51 may be provided along the entire length of the dairy inflation 11.

While the inner periphery 55 and outer periphery 57 have been described above as having elliptical and circular shapes, respectively, the inner periphery 55 may be circular and the outer periphery 57 may be elliptical. Alternatively, the shape of the inner and outer peripheries 55, 57 could be triangular, square, rectangular, polygonal, fluted, or any other shape. In some embodiments, such as the embodiment described with reference to FIG. 2, the complementary arrangement of the inner and outer peripheries may form the reduced-thickness region. However, the inner and outer peripheries could alternatively have similar or identical shapes with a notch or other indentation formed in one of the exterior or interior surfaces 43, 45 to create the reduced-thickness region 51.

The milk tube portion 25 includes a reinforcement ring 71 positioned around an exterior surface of the milk tube portion 25 and an opening 73 that is configured to be attached to a claw of a milk collection apparatus (not shown). The claw provides a male fitting that is inserted into the axial passage 27 of the milk tube portion 25. The reinforcement ring 71 prevents tearing or other damage to the milk tube portion 25 that could be caused by the claw.

Figure 3:
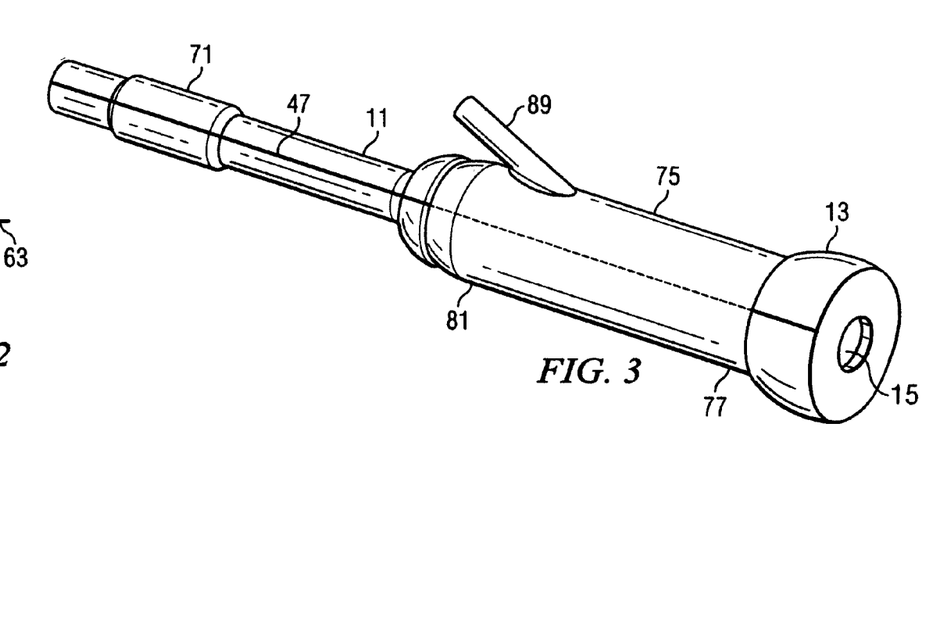
Figure 4:
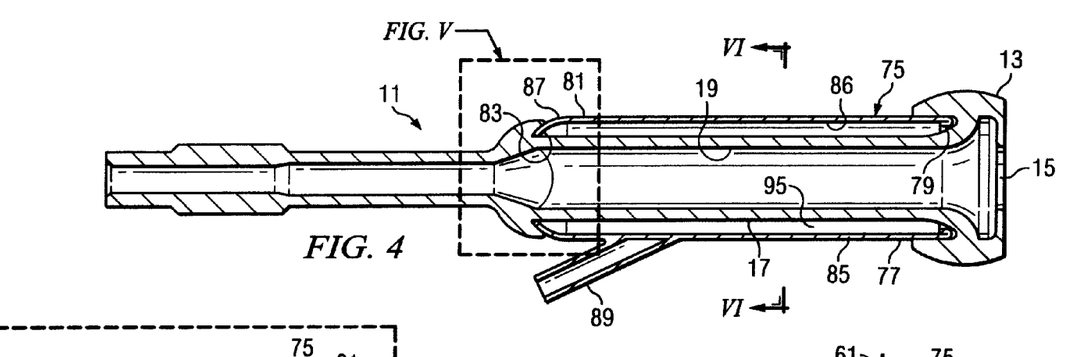
FIG. 4 depicts a cross-sectional front view of the dairy inflation and shell member of FIG. 3.

Referring to FIGS. 3 and 4, in use the dairy inflation is received by a shell member 75 that may be constructed from a relatively non-flexible material such as steel, polyvinyl chloride, plastic, or other non-flexible material. The shell member 75 includes a proximal end 77 having a proximal opening 79 and a distal end 81 having a distal opening 83. The shell member 75 may be formed from a substantially cylindrical wall 85, although the cross-sectional shape of shell member 75 could be any shape. In one embodiment, the cross-sectional shape of the wall 85 is identical to that of the outer periphery 57 of the dairy inflation. The wall 85 of the shell member 75 defines an axial passage 86. The inner diameter of the shell member 75 is preferably uniform throughout the majority of the shell member 75, with the exception of an inwardly tapered portion 87 at the distal end 81 of the shell member 75. The diameter of the inwardly tapered portion 87 gradually decreases until reaching a minimum diameter associated with the distal opening 83. The shell member 75 further includes a vacuum tube 89 connected to the wall 85 to allow fluid communication with the axial passage 86.

Figure 5:
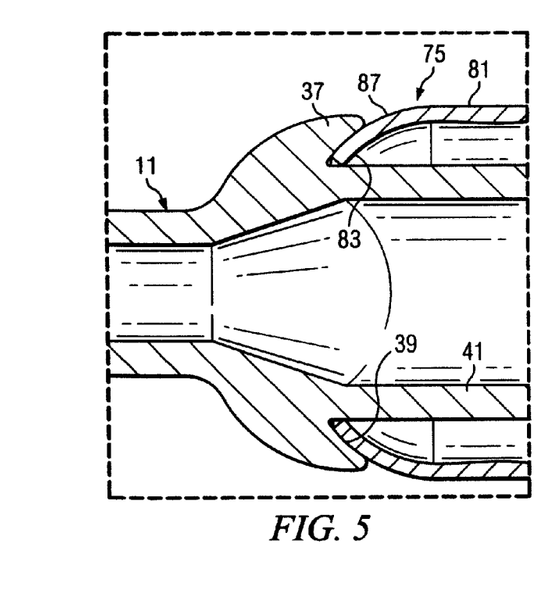
FIG. 5 illustrates an enlarged cross-sectional front view of the dairy inflation and shell member of FIG. 4 taken at Detail V.

When engaged to the dairy inflation 11, the proximal end 77 of the shell member 75 may be received by the recess 14 and sealingly engage the lip 16 of the mouth portion 13. The distal end 81 may be received by the recess 39 and sealingly engage the umbrella 37 of the barrel portion 17. The reinforcement ring 35 prevents premature wear or tearing of the dairy inflation 11 caused by the distal end 81 of the shell member 85. As illustrated in FIGS. 4 and 5, the lip 16 of the mouth portion 13 and the umbrella 37 of the barrel portion 17 are sized to provide an interference fit with the shell member 75. As the dairy inflation 11 is placed within the shell member 75, the lip 16 and the umbrella 37 may elastically deform to allow the ends of the shell member 75 to fit within each of the respective recesses 14, 39. This elastic deformation allows the dairy inflation 11 to more effectively seal each end of the shell member 75.

The opening 15 of the mouth portion of 13 is placed over the teat of an animal to be milked. The mouth portion 13, like the other portions of the dairy inflation, is flexible, and a relatively tight seal is obtained around the teat of the animal. When the teat is fully engaged by the dairy inflation 11, the teat extends into the barrel portion 17 of the dairy inflation 11. In practice, several teats of an animal are milked together to increase milk production and reduce the level of physical stress to the animal. Each teat of the animal may carry a separate dairy inflation 11. The dairy inflations 11 are connected at the opposite end to a milk collection apparatus (not shown). The milk collection apparatus includes a claw having a male fitting that is inserted through the opening 73 of the milk tube portion 25. The male fitting extends into the axial passage 27 until the end of the male fitting is located beneath the reinforcement ring 71. The reinforcement ring 71 provides added resistance to tearing that could be caused by contact of the milk tube portion 25 with the end of the male fitting. A plurality of male fittings is typically provided, one for each dairy inflation.

Figure 6A:
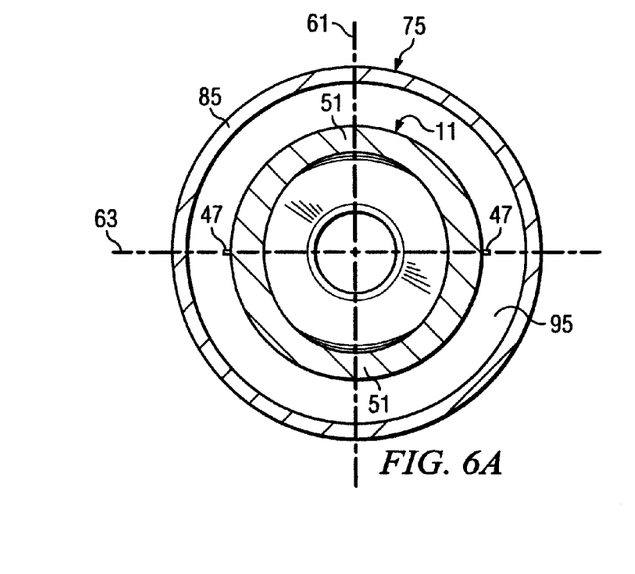
FIGS. 6A and 6B depict cross-sectional side views of the dairy inflation and shell member of FIG. 4 taken at VI-VI, the dairy inflation being shown in a relaxed position (FIG. 6A) and a collapsed position (FIG. 6B)
Figure 6B:
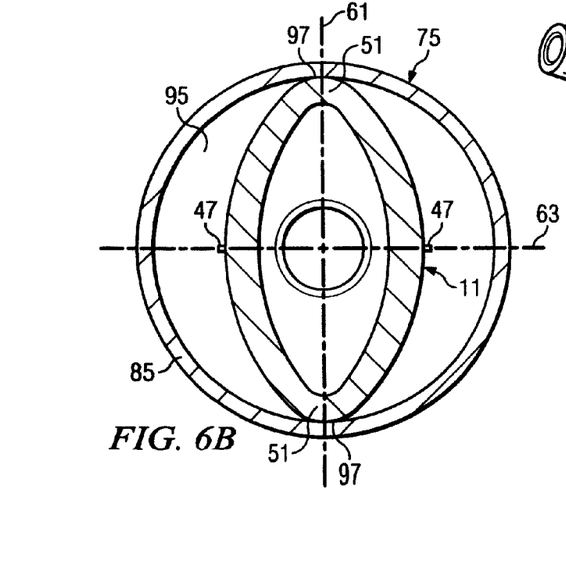

Referring to FIGS. 5, 6A, and 6B, a vacuum source (not shown) is connected to the vacuum tube 89 of the shell member 75 to cyclically apply vacuum pressures to an annulus 95 formed between the wall 85 of the shell member 75 and the barrel portion 17 of the dairy inflation. When vacuum pressure is not applied to the annulus 95, the barrel portion 17 is in a relaxed position (see FIG. 6A). When vacuum pressure is applied to the annulus 95, the barrel portion 17 moves into a collapsed position (see FIG. 6B). As the vacuum pressure is cyclically applied to the annulus 95, the barrel portion 17 of the dairy inflation 11 alternates between the relaxed position and the collapsed position, thereby massaging the teat of the animal in a similar manner to the process by which a teat would be hand milked. The massaging of the teat ejects milk from the teat which flows through the axial passage 19 of the barrel portion 17, the axial passage 27 of the milk tube portion 25, and into the milk collection apparatus.

Referring to FIG. 6B, the barrel portion 17 collapses as the reduced-thickness regions 51 of the wall 41 are pulled radially outward toward the wall 85 of the shell member 75. Since the wall 41 at the reduced-thickness region 51 is thinner than the wall 41 along the minor axis 63 adjacent the parting lines 47, it is the wall 41 at the reduced-thickness regions 51 that is pulled radially outward. The wall 41 near the parting lines 47 therefore remains relatively flat, while the wall 41 in the reduced-thickness regions 51 is forced into a more angular position having an apex 97. This positioning of the wall 41 near the reduced-thickness regions 51 imparts greater stress to the wall 41 than that imposed near the parting lines 47.

Although the wall 41 near the reduced-thickness regions 51 is thinner, it has been found through testing that this portion of the wall 41 is still better equipped to handle increased stresses than the wall 41 near the parting lines 47. The reduced-thickness regions 51, whether provided by complimentary but different shapes of the inner and outer periphery, or whether provided by indentations or recesses disposed on the interior or exterior surfaces, assist in controlling the collapse of the dairy inflation 11 such that areas of higher stress are not applied to the wall 41 at certain locations, in this particular embodiment near the parting lines 47.

Figure 7:
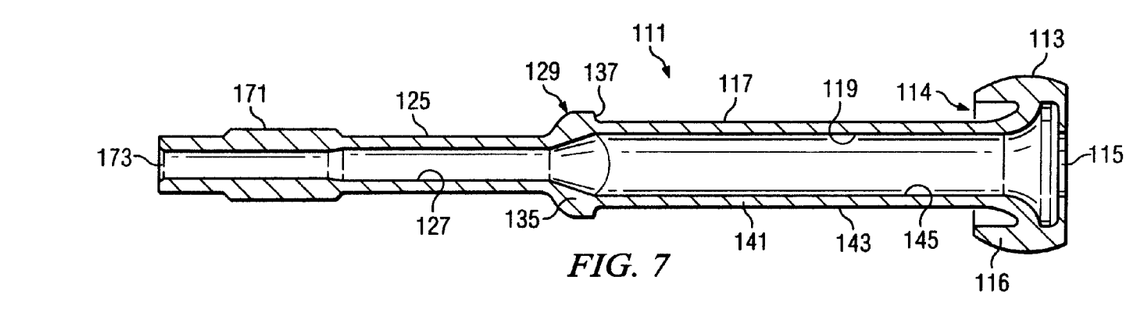
FIG. 7 illustrates a cross-sectional front view of a dairy inflation according to an embodiment of the present invention.

Referring to FIG. 7, a dairy inflation 111 according to an embodiment of the present invention is provided for extracting milk from a cow or other animal. The dairy inflation 111 includes a mouth portion 113 having an opening 115 configured to engage a teat of the animal. The mouth portion 113 includes a lip 116 extending away from the opening 115 to create a recess 114. A barrel portion 117 may be integrally connected to the mouth 113, the barrel portion 117 having an axial passage 119 fluidly connected to the opening 115 of the mouth portion 113. A milk tube portion 125 may be integrally connected to the barrel portion 117, the milk tube portion 125 having an axial passage 127 fluidly connected to the axial passage 119 of the barrel portion 117. Preferably, though not necessarily, the opening 115 of the mouth portion 113, the axial passage 119 of the barrel portion 117, and the axial passage 127 of the milk tube portion 125 are coaxial. In one embodiment, the diameter of the axial passage 127 may be less than the diameter of the axial passage 119. In this embodiment, the barrel portion 117 may include a transition region 129 at an end of the barrel portion 117 opposite the mouth portion 113. The axial passage 119 passing through the transition region 129 tapers down to a smaller diameter that preferably equals the diameter of the axial passage 127 of the milk tube portion 125.

A reinforcement ring 135 may be circumferentially positioned around an outer surface of the barrel portion 117 at the transition region 129. As will be discussed in more detail below, the reinforcement ring 135 provides additional material in the transition region 129 to minimize the risk of the dairy inflation 111 tearing in this particular region. In the embodiment illustrated in FIGS. 7-10, the reinforcement ring 135 may include a rounded shoulder 137.

Figure 8:
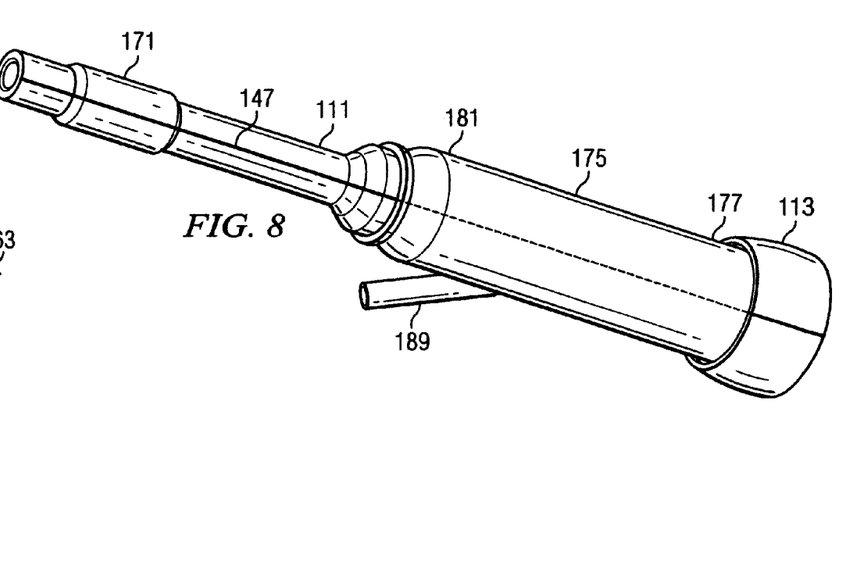
FIG. 8 depicts a perspective view of the dairy inflation of FIG. 7 inserted within a shell member.

Referring still to FIG. 7, but also to FIG. 8, the axial passages 119, 127 are defined by a wall 141 having an exterior surface 143 and an interior surface 145. A parting line 147 runs the axial length of the dairy inflation 111 and may be formed by the multi-piece molding operation previously described.

The wall 141 of the barrel portion 117 is shaped such that it contains at least one, and preferably more than one, reduced-thickness region similar to the reduced-thickness regions 151 illustrated in FIG. 2. The reduced-thickness regions of dairy inflation 111 are formed in a similar manner as those of dairy inflation 11 previously described.

The milk tube portion 125 includes a reinforcement ring 171 positioned around an exterior surface of the milk tube portion 125 and an opening 173 that is configured to be attached to a claw of a milk collection apparatus (not shown). The claw provides a male fitting that is inserted into the axial passage 127 of the milk tube portion 125. The reinforcement ring 171 prevents tearing or other damage to the milk tube portion 125 that could be caused by the claw.

Figure 9:
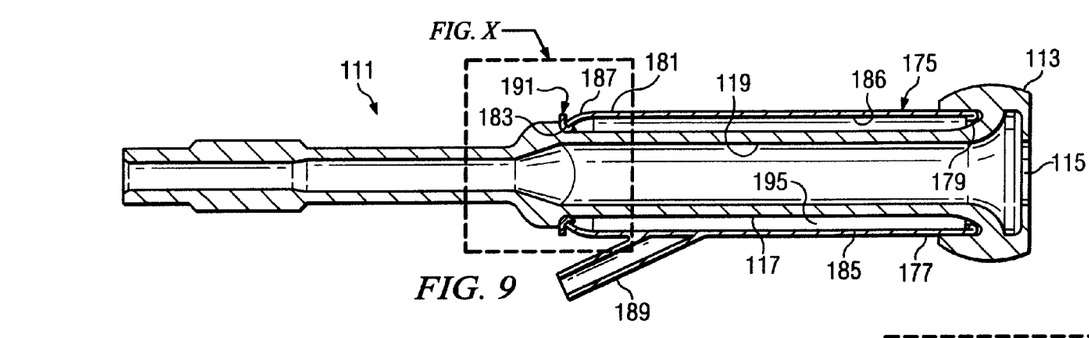
FIG. 9 illustrates a cross-sectional front view of the dairy inflation and shell member of FIG. 8.

Referring to FIGS. 8 and 9, in use the dairy inflation 111 is received by a shell member 175 that may be constructed from a relatively non-flexible material such as steel, polyvinyl chloride, plastic, or other non-flexible material. The shell member 175 includes a proximal end 177 having a proximal opening 179 and a distal end 181 having a distal opening 183. The shell member 175 may be formed from a substantially cylindrical wall 185, although the cross-sectional shape of shell member 175 could be any shape. In one embodiment, the cross-sectional shape of the wall 185 is identical to that of the outer periphery 157 of the dairy inflation. The wall 185 of the shell member 175 defines an axial passage 186. The inner diameter of the shell member 175 is preferably uniform throughout the majority of the shell member 175, with the exception of an inwardly tapered portion 187 at the distal end 181 of the shell member 175. The diameter of the inwardly tapered portion 187 gradually decreases until reaching a minimum diameter associated with the distal opening 183. The shell member 175 further includes a vacuum tube 189 connected to the wall 185 to allow fluid communication with the axial passage 186.

Figure 10:
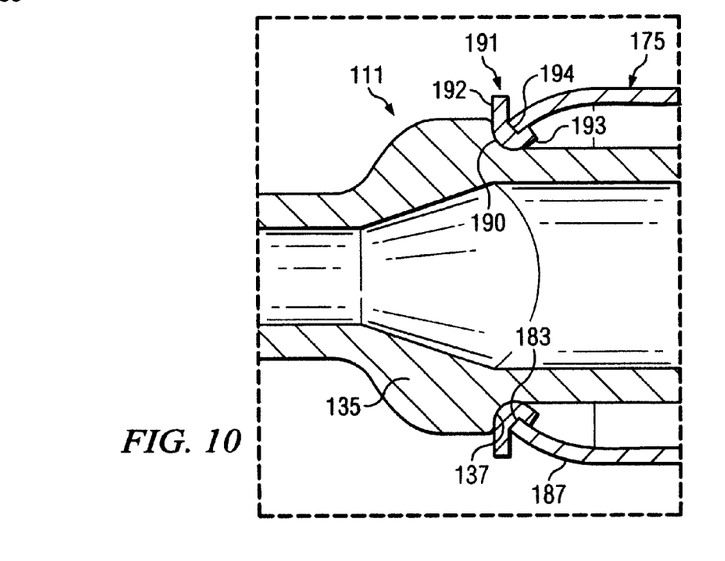
FIG. 10 depicts an enlarged cross-sectional front view of the dairy inflation and shell member of FIG. 9 taken at Detail X.

Referring more specifically to FIGS. 9 and 10, a ring 191 includes a planar region 192 and a hook region 193. The hook region 193 may be integrally connected on a radially inward side of the planar region, the hook region 193 extending radially outward to form a recess 194. An outer radius 190 is provided in the hook region 193 of the ring 191. In one embodiment, the ring 191 is constructed from nylon. Alternatively, the ring 191 could be made from any other material, including without limitation rubbers or other elastomers, thermoplastics, or other plastic materials.

When engaged to the dairy inflation 111, the proximal end 177 of the shell member 175 may be received by the recess 114 and sealingly engage the lip 116 of the mouth portion 113. The ring 191 is preferably snapped onto the distal end 181 of the shell member 175 such that the distal end 181 may be received by the recess 194 of the ring 191. The shell member 175 and ring 191 are then placed against the reinforcement ring 135 of the barrel portion such that the ring 191 abuts the shoulder 137. The shoulder 137 prevents the ring 191, and thus the shell member 175 from sliding past the reinforcement ring 135, while the ring 191 serves as a sacrificial guard between the non-flexible shell member 175 and the flexible dairy inflation 111. As illustrated in FIG. 10, the inwardly tapered portion 187 of the shell member 175 makes the distal opening 183 point radially inward, which may present a sharp edge that may prematurely tear or cut the dairy inflation. By placing the ring 191 between the shell member 175 and the dairy inflation 111, the distal opening 183 is prevented from cutting or tearing the dairy inflation 111. The ring 191 is removable from the shell member 175 for easy replacement if the ring 191 becomes worn.

As illustrated in FIGS. 9 and 10, the lip 116 of the mouth portion 113 and the shoulder 137 of the barrel portion 117 are sized to provide an interference fit with the shell member 175 and ring 191, respectively. As the dairy inflation 111 is placed within the shell member 175, the lip 116 may elastically deform to allow the end of the shell member 175 to fit within the recess 114. Similarly, the shoulder 137 may elastically deform to provide a tight fit with the ring 191. These elastic deformations allow the dairy inflation 111 to more effectively seal each end of the shell member 175.

The dairy inflation 111 is attached to the teat of an animal and used to milk the animal in the same manner as that described above with reference to dairy inflation 11. The reduced-thickness regions of the dairy inflation 111 similarly allow the controlled collapse of the barrel portion 117 within the shell member 175 such that the areas of highest stress are not applied to the wall 141 at certain locations, in this particular embodiment near the parting lines 147. The controlled collapse of the barrel portion 117 during cyclical application of vacuum pressure is described above with reference to FIGS. 6A and 6B.

While described above as being formed from a single, integral piece of material, the dairy inflations 11 and 111 may be formed from multiple pieces of material that are joined either by connectors, adhesives, or other bonding or attachment methods. The dairy inflation may be manufactured by compression, transfer or injection molding, or any other suitable manufacturing process.

It should be noted that the characteristics of the dairy inflations 11, 111 described above could be implemented in dairy inflations made of any material using any manufacturing process. The reduced-thickness regions of the dairy inflations 11, 111 are particularly useful when used with dairy inflations that are formed from multi-piece molds and dairy inflations made from silicone polymers. Similarly, while the ring 191 could be provided to prevent premature cutting or tearing of any dairy inflation, the ring 191 is particularly useful with dairy inflations constructed from silicone polymers due to the relatively lower tear strengths of silicone polymers.

In one embodiment of the present invention, the dairy inflations 11, 111 may be molded from a silicone compound as described in more detail below with reference to Tables 1-8. The components of the dairy inflation compound are provided in Table 1. The compound includes a high tear silicone base that is further detailed in Table 2 and a second silicone base that is further detailed in Table 3.

TABLE 1

Dairy Inflation Compound

| Compound | Preferred Amount (Weight %) | Range (Weight %) |
|---|---|---|
| High Tear Silicone Base (see Table 2) | 62.0 | 45-75 |
| Second Silicone Base (see Table 3) | 28.0 | 25-55 |
| High Vinyl Silicone Gum | 1.0 | 0.5-10 |
| Black Iron Oxide (pigment) | 1.8 | 0.1-5 |
| Zinc Stearate (internal mold release) | 0.2 | 0.1-5 |
| Silicon Hydride (crosslinking agent) | 5.1 | 0.1-25 |
| Chloro Platanic Acid (catalyst) | 0.9 | 0.1-5 |
| Ethynl Cyclohexanol (inhibitor) | 1.0 | 0.05-5 |

The high vinyl silicone gum is a polymer containing both pendant and end blocked vinyl having a vinyl equivalent of 2500-6000 per 100 grams. The high vinyl silicone gum could include a polydimethylvinylsiloxane polymer having 13.0% pendant and end-blocked vinyl similar to the polymer used in the high tear silicone base described below. An example of this polymer may include Dow Corning 410 Gum.

TABLE 2

High Tear Silicone Base

| Compound | Preferred Amount (Weight %) | Range (Weight %) |
|---|---|---|
| Polydimethylvinylsiloxane polymer containing 0.2% end blocked vinyl | 60.0 | 45-65 |
| Polydimethylvinylsiloxane polymer containing 13.0% pendant and end blocked vinyl | 7 | 4-10 |
| Untreated Fumed Silica | 27 | 20-30 |
| Dimethylsiloxane Fluid OH end blocked | 4 | 5-10 |
| Silicone Hydride (crosslinking agent) | 2 | 0.5-5 |

The high tear silicone base preferably has a durometer range of 45-55 Shore A pts. An example of the high tear silicone base is part number ELR 427/50 manufactured by Wacker Chemical Corporation.

TABLE 3

Second Silicone Base

| Compound | Preferred Amount (Weight %) | Range (Weight %) |
|---|---|---|
| Polydimethylvinylsiloxane polymer containing 0.2% end blocked vinyl | 60.0 | 50-70 |
| Untreated Fumed Silica | 33 | 20-40 |
| Dimethylsiloxane Fluid OH end blocked | 7 | 2-15 |

The second silicone base preferably has a durometer range of 65-75 Shore A pts. An example of the second silicone base is part number ELR 407/70 manufactured by Wacker Chemical Corporation.

While two bases were used to compound the formulation represented in Table 1, a single base may be used to achieve the same result. A dairy inflation compound having a single base according to an embodiment of the present invention is presented in Table 4.

TABLE 4

Dairy Inflation Compound

| Compound | Preferred Amount (Weight %) | Range (Weight %) |
|---|---|---|
| Silicone Base (see Table 5) | 90 | 45-75 |
| High Vinyl Silicone Gum | 1.0 | 0.5-10 |
| Black Iron Oxide (pigment) | 1.8 | 0.1-5 |
| Zinc Stearate (internal mold release) | 0.2 | 0.1-5 |
| Silicon Hydride (crosslinking agent) | 5.1 | 0.1-25 |
| Chloro Platanic Acid (catalyst) | 0.9 | 0.1-5 |
| Ethynl Cyclohexanol (inhibitor) | 1.0 | 0.05-5 |

The silicone base used in the dairy inflation compound of Table 4 is represented by its components in Table 5.

TABLE 5

Silicone Base

| Compound | Preferred Amount (Weight %) | Range (Weight %) |
|---|---|---|
| Polydimethylvinylsiloxane polymer containing 0.2% end blocked vinyl | 60.0 | 50-70 |
| Polydimethylvinylsiloxane polymer containing 13.0% pendant and end blocked vinyl | 4 | 1-10 |
| Untreated Fumed Silica | 29 | 20-40 |
| Dimethylsiloxane Fluid OH end blocked | 6 | 2-12 |
| Silicone Hydride (crosslinking agent) | 1 | 0.1-5 |

The silicone base of Table 5 preferably has a durometer range of 50-60 Shore A pts. An example of the silicone base is part number TR-55 manufactured by Dow Corning.

A dairy inflation compound according to an embodiment of the present invention includes the components listed in Table 6. For this particular compound, pre-prepared bases are not used. Instead, the compound is manufactured directly from polymer and fumed silica treated with a dimethyl fluid to prevent creep of the compound.

TABLE 6

Dairy Inflation Compound

| Compound | Preferred Amount (Weight %) | Range (Weight %) |
|---|---|---|
| Polydimethylvinylsiloxane polymer containing 0.2% end blocked vinyl | 57 | 45-65 |
| Polydimethylvinylsiloxane polymer containing 13.0% pendant and end blocked vinyl | 4 | 1-10 |
| Treated Fumed Silica | 26 | 20-40 |
| Dimethylsiloxane Fluid OH end blocked | 3 | 1-10 |
| Black Iron Oxide (pigment) | 1.8 | 0.1-5 |
| Zinc Stearate (internal mold release) | 0.2 | 0.1-5 |
| Silicon Hydride (crosslinking agent) | 6.1 | 0.1-25 |
| Chloro Platanic Acid (catalyst) | 0.9 | 0.1-5 |
| Ethynl Cyclohexanol (inhibitor) | 1.0 | 0.05-5 |

The dairy inflation compounds of Tables 1, 4, and 6 preferably have a durometer range of 50-60 Shore A pts, and more preferably have a durometer of 55 Shore A pts. Other preferred properties of the compounds are listed in Table 7.

TABLE 7

Properties of Dairy Inflation Compounds

| Property | Preferred Amount |
|---|---|
| Specific Gravity | 1.14 |
| Durometer, Shore A pts | 55 |
| Tensile Strength, psi | 1327 |
| Elongation, % | 905 |
| Tear Strength, ppi | 233 |

The tear strength of the dairy inflation compound of the present invention overcomes shortcomings of previous silicone inflations. This is accomplished by combining a high vinyl base and platinum cure system, which gives high tear strength and excellent physical properties. The combination of high vinyl polymers and a platinum cure system also results in a very high crosslink density, which results in extremely low milk fat absorption. Because the absorption of milk fat may lead to malodorous emissions, low milk fat absorption is desired, and this property of the compound overcomes problems associated with previous silicone inflations.

The high crosslink density of the dairy inflation compound further provides a non-tacky surface, which results in a low drag coefficient. The low drag coefficient prevents the dairy inflation from moving upward on the cow's udder, which can irritate the cow and cause the cow to kick the milking apparatus off. The low drag coefficient of the dairy inflation compound also allows a lower vacuum level to be used when milking cows. Lower vacuum levels put less stress on the cow and avoid cow health issues.

The dairy inflation compound of the present invention contains no plasticizers or ingredients that may leach out of the inflation and contaminate the milk. Organic inflations exhibit this leaching characteristic and because of that must be changed more frequently. The dairy inflation described herein is capable of 8000 individual cow milkings (ICMs) and does not exhibit any leaching characteristics.

Testing data for the dairy inflation compounds described above is shown in Tables 8-15. In Table 8, measured physical properties of the silicone compound are illustrated. The tensile strength and elongation were determined using standard ASTM D412, Standard Test Methods for Vulcanized Rubber and Thermoplastic Elastomers in Tension. The tear strength was determined using standard ASTM D624, Standard Test Methods for Tear Strength of Conventional Vulcanized Rubber and Thermoplastic Elastomers.

TABLE 8

Physical Properties of Silicone Compound

| Physical Property | Silicone Compound |
|---|---|
| Tensile, psi | 1353 |
| Elongation, % | 950 |
| Modulus @ 100%, psi | 246 |
| Specific Gravity | 1.14 |

Table 9 displays test results from an air aging stability test that was performed at elevated temperatures to simulate an aging process that may be encountered by the compound. The air aging test was conducted in accordance with standard ASTM D573, Standard Test Methods for Rubber Deterioration in an Air Oven.

TABLE 9

Air Aging Stability Test

| Exposure | Hardness Changes, Shore A Points |
|---|---|
| 166 hrs. ± ½ hr @ 212° F. (100° C.) | 9 |
| 166 ± ½ hr @ 158° F. (70° C.) | 5 |

Tables 10-15 illustrate test results from milk fat, distilled water, and chemical absorption tests. The chemicals tested included nitric acid, phosphoric acid, alkaline cleaners, and chlorine sanitizers to simulate exposure of the compound to cleaning agents, which are typically used to clean dairy inflations following the milking process. The liquid test results illustrated in Tables 10-15 were obtained using standard ASTM D471, Standard Test Methods for Rubber Property Liquids.

TABLE 10

Milk Fat Absorption Test

| Exposure | Hardness Changes, Shore A Points | Change in Weight % | Change in Volume % |
|---|---|---|---|
| 22 ± ¼ hr @ 158° F. (70° C.) | −2 | 0.17 | −0.68 |

TABLE 11

Distilled Water Absorption Test

| Exposure | Hardness Changes, Shore A Points | Change in Weight % | Change in Volume % |
|---|---|---|---|
| 22 ± ¼ hr @ 158° F. (70° C.) | 0 | 0.52 | −0.26 |

TABLE 12

Nitric Acid Test

| Exposure | Hardness Changes, Shore A Points | Change in Weight % | Change in Volume % |
|---|---|---|---|
| 22 ± ¼ hr @ 180° F. ± 2° F. (82° C. ± 1° C.) | 0 | 1.3 | 0.59 |

TABLE 13

Phosphoric Acid Test

| Exposure | Hardness Changes, Shore A Points | Change in Weight % | Change in Volume % |
|---|---|---|---|
| 22 ± ¼ hr @ 180° F. ± 2° F. (82° C. ± 1° C.) | 0 | −1.7 | −0.50 |

TABLE 14

Alkaline Cleaner Test

| Exposure | Hardness Changes, Shore A Points | Change in Weight % | Change in Volume % |
|---|---|---|---|
| 22 ± ¼ hr @ 180° F. ± 2° F. (82° C. ± 1° C.) | −2 | −0.41 | −1.1 |

TABLE 15

Chlorine Sanitizer Test

| Exposure | Hardness Changes, Shore A Points | Change in Weight % | Change in Volume % |
|---|---|---|---|
| 22 ± ¼ hr @ 70° F. ± 2° F. (21° C. ± 1° C.) | 1 | 0.21 | −0.02 |

The dairy inflation compounds described herein are certified under the 3-A® Sanitary Standards for Multiple-Use Rubber and Rubber-Like Materials Used as Product Contact Surfaces in Dairy Equipment, Number 18-03. This standard was formulated by the International Association of Food Industry Suppliers (IAFIS), the International Association for Food Protection (IAFP), the United States Public Health Service (USPHS), The European Hygienic Equipment Design Group (EHEDG), and The Dairy Industry Committee (DIC). The compound is certified to Class IV, which is for inflations and hose, but also meets the requirements of Classes I, II, and III.

It should be apparent from the foregoing that an invention having significant advantages has been provided. While the invention is shown in only a few of its forms, it is not just limited but is susceptible to various changes and modifications without departing from the spirit thereof.

We claim:

1. A dairy inflation comprising:
a mouth portion having an opening to receive the teat of an animal;
a barrel portion having an axial passage defined by a wall and fluidly connected to the opening of the mouth portion, the wall having at least one reduced thickness region at a cross-section of the wall perpendicular to a longitudinal axis of the axial passage, the reduced thickness region being a portion of the wall at the cross-section that is of lesser thickness than another portion of the wall at the cross-section, controlled collapse of the barrel portion during milking operations being provided by the reduced thickness region;
a milk tube portion connected to the barrel portion, the milk tube portion having an axial passage fluidly connected to the axial passage of the barrel portion; and
a shell member having an axial passage that receives the barrel portion, a proximal end of the shell member engaging the mouth portion;
wherein the barrel portion is not constrained by the shell member to prevent collapse of the barrel portion within the axial passage of the shell member;
wherein the wall of the barrel portion includes an exterior surface at the cross-section defining an outer periphery having one of a substantially circular shape and a substantially elliptical shape;
wherein the wall of the barrel portion includes an interior surface at the cross-section defining an inner periphery having the other of the substantially circular shape and the substantially elliptical shape.

2. The dairy inflation of claim 1, further comprising:
a parting line formed on the wall of the barrel portion and oriented substantially parallel to a longitudinal axis of the axial passage of the barrel portion; and
wherein the controlled collapse of the barrel portion directs the highest stresses imposed on the wall away from the parting line.

3. The dairy inflation of claim 1, wherein:
the elliptically shaped periphery includes a major axis and a minor axis.

4. The dairy inflation of claim 3, wherein the reduced thickness region is on opposing sides of the wall along the major axis.

5. The dairy inflation of claim 1, further comprising:
a parting line formed on the wall of the barrel portion and oriented substantially parallel to a longitudinal axis of the axial passage of the barrel portion;
wherein the controlled collapse of the barrel portion directs the highest stresses imposed on the wall away from the parting line;
wherein the elliptically shaped periphery includes a major axis and a minor axis.

6. The dairy inflation of claim 5, wherein the reduced thickness region is on opposing sides of the wall along the major axis.

7. The dairy inflation of claim 5, wherein the elliptically shaped periphery is oriented such that the minor axis passes through the parting line.

8. The dairy inflation of claim 1, wherein:
the barrel portion is made from a compound having a first methyl vinyl silicone polymer from about 45 to 65 weight percent, a second methyl vinyl silicone polymer from about 1 to 10 weight percent, fumed silica from about 20 to 40 weight percent, dimethylsiloxane fluid OH end block from about 1 to 10 weight percent, silicone hydride from about 0.1 to 25 weight percent, a platinum catalyst from about 0.1 to 5 weight percent, and an inhibitor from about 0.05 to 5 weight percent;
the first methyl vinyl silicone polymer includes about 0.2 weight percent end-blocked vinyl; and
the second methyl vinyl silicone polymer includes about 13.0 weight percent pendant and end-blocked vinyl.

9. A dairy inflation comprising:
a barrel portion having an axial passage defined by a wall, the wall having an exterior surface at a cross-section of the wall perpendicular to a longitudinal axis of the axial passage, the exterior surface defining an outer periphery having one of a substantially circular shape and a substantially elliptical shape; the wall further having an interior surface at the cross-section defining an inner periphery having the other of the substantially circular shape and the substantially elliptical shape, the elliptically shaped periphery having a major axis and a minor axis, the wall having a reduced thickness region on each opposing side of the wall along the major axis; and
a milk tube portion connected to the barrel portion, the milk tube portion having an axial passage fluidly connected to the axial passage of the barrel portion.

10. The dairy inflation of claim 9, wherein the reduced thickness regions allow a controlled collapse of the barrel portion during milking operations.

11. The dairy inflation of claim 10, further comprising:
a parting line disposed along the wall of the barrel portion and oriented substantially parallel to a longitudinal axis of the axial passage of the barrel portion; and
wherein the controlled collapse of the barrel portion directs the highest stresses imposed on the wall away from the parting line.

12. The dairy inflation of claim 11, wherein the elliptically shaped periphery is oriented such that the minor axis passes through the parting line.

13. The dairy inflation of claim 9, wherein:
the barrel portion is made from a compound having a first methyl vinyl silicone polymer from about 45 to 65 weight percent, a second methyl vinyl silicone polymer from about 1 to 10 weight percent, fumed silica from about 20 to 40 weight percent, dimethylsiloxane fluid OH end block from about 1 to 10 weight percent, silicone hydride from about 0.1 to 25 weight percent, a platinum catalyst from about 0.1 to 5 weight percent, and an inhibitor from about 0.05 to 5 weight percent;
the first methyl vinyl silicone polymer includes about 0.2 weight percent end-blocked vinyl; and
the second methyl vinyl silicone polymer includes about 13.0 weight percent pendant and end-blocked vinyl.

14. A dairy inflation comprising an axial passage defined by a wall having at least one region of reduced thickness at a cross-section of the wall perpendicular to a longitudinal axis of the axial passage, the region of reduced thickness being a portion of the wall at the cross-section that is of lesser thickness than another portion of the wall at the cross-section, a parting line formed along a length of the wall substantially parallel to the longitudinal axis, the region of reduced thickness allowing a controlled collapse of the wall to direct higher stress to portions of the wall away from the parting line, wherein the wall includes an exterior surface at the cross-section defining an outer periphery having one of a substantially circular shape and a substantially elliptical shape, and wherein the wall includes an interior surface at the cross-section defining an inner periphery having the other of the substantially circular shape and the substantially elliptical shape.

15. The dairy inflation of claim 14, wherein:
the elliptically shaped periphery includes a major axis and a minor axis.

16. The dairy inflation of claim 15, wherein the reduced thickness region is on opposing sides of the wall along the major axis.

17. The dairy inflation of claim 15, wherein the elliptically shaped periphery is oriented such that the minor axis passes through the parting line.

18. The dairy inflation of claim 14, wherein:
the wall is made from a compound having a first methyl vinyl silicone polymer from about 45 to 65 weight percent, a second methyl vinyl silicone polymer from about 1 to 10 weight percent, fumed silica from about 20 to 40 weight percent, dimethylsiloxane fluid OH end block from about 1 to 10 weight percent, silicone hydride from about 0.1 to 25 weight percent, a platinum catalyst from about 0.1 to 5 weight percent, and an inhibitor from about 0.05 to 5 weight percent;
the first methyl vinyl silicone polymer includes about 0.2 weight percent end-blocked vinyl; and
the second methyl vinyl silicone polymer includes about 13.0 weight percent pendant and end-blocked vinyl.

* * * * *